US008672262B2

(12) United States Patent
Griffin

(10) Patent No.: US 8,672,262 B2
(45) Date of Patent: Mar. 18, 2014

(54) MECHANICALLY OPTIMIZED LIQUID INERTIA VIBRATION ELIMINATOR AND AIRCRAFT PYLON SYSTEM

(75) Inventor: Maurice D. Griffin, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 37 days.

(21) Appl. No.: 13/347,237

(22) Filed: Jan. 10, 2012

(65) Prior Publication Data

US 2013/0175389 A1 Jul. 11, 2013

(51) Int. Cl.
| B64C 27/00 | (2006.01) |
| B63H 7/02 | (2006.01) |
| F01D 25/04 | (2006.01) |
| F03B 11/04 | (2006.01) |
| F04D 29/66 | (2006.01) |

(52) U.S. Cl.
USPC ......... 244/54; 244/17.27; 244/17.11; 244/23; 416/500

(58) Field of Classification Search
USPC ................. 244/17.27, 17.11, 54, 23; 416/500
See application file for complete search history.

(56) References Cited

U.S. PATENT DOCUMENTS

| 4,365,771 | A | 12/1982 | Halwes | |
| 6,009,983 | A * | 1/2000 | Stamps et al. | 188/298 |
| 6,431,530 | B1 * | 8/2002 | Stamps et al. | 267/136 |
| 6,474,596 | B1 * | 11/2002 | Cousin et al. | 244/54 |
| 2002/0060268 | A1 * | 5/2002 | Smith et al. | 244/54 |
| 2006/0151272 | A1 * | 7/2006 | Smith et al. | 188/378 |
| 2006/0261530 | A1 * | 11/2006 | Stamps et al. | 267/140.11 |
| 2011/0316207 | A1 * | 12/2011 | Smith et al. | 267/140.15 |

FOREIGN PATENT DOCUMENTS

| WO | 01/90597 A1 | 11/2001 |
| WO | 2004/111489 A2 | 12/2004 |
| WO | 2010/104508 A1 | 9/2010 |

OTHER PUBLICATIONS

Smith, Michael R., Principle Engineer, "The Model 427 Pylon Isolation System", first archived Jan. 18, 2004, accessed Apr. 5, 2013. <http://www.fuentek.com/images/VIS/00113.PDF>.*
Extended European Search Report issued by the European Patent Office dated Nov. 21, 2012 from corresponding application 12154479.5-1254 9 pages.
Partial European Search Report issued by the European Patent Office dated Jul. 12, 2012 from corresponding application 12154479.5-1254 9 pages.

* cited by examiner

*Primary Examiner* — Tien Dinh
*Assistant Examiner* — Michael Wang
(74) *Attorney, Agent, or Firm* — James E. Walton; Damon R. Hickman

(57) ABSTRACT

A vibration isolator includes an upper housing and a lower housing; an upper reservoir housing defining a upper fluid chamber; a lower reservoir housing defining a lower fluid chamber; a piston spindle resiliently coupled to the upper housing with an upper elastomer member, the piston spindle being resiliently coupled to the lower housing with a lower elastomer member; an elongated portion having a tuning passage; and a tuning fluid disposed there within. The vibration isolator cancels vibratory forces at an isolation frequency. The vibration isolator is utilized in a pylon system for mounting a transmission in an aircraft. The vibration isolator is located between a pylon structure and a roof structure. The isolator includes a spherical bearing assembly that is located near a waterline location of a rotational axis of a drive shaft.

17 Claims, 6 Drawing Sheets

MECHANICALLY OPTIMIZED LIQUID INERTIA VIBRATION ELIMINATOR AND AIRCRAFT PYLON SYSTEM

BACKGROUND

1. Technical Field

The present application relates in general to vibration control. More specifically, the present application relates to methods and apparatus for isolating mechanical vibrations in structures or bodies that are subject to harmonic or oscillating displacements or forces. The present application is well suited for use in the field of aircraft, in particular, helicopters and other rotary wing aircraft.

2. Description of Related Art

For many years, effort has been directed toward the design of an apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the aircraft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in U.S. Pat. No. 5,435,531, titled "Vibration Isolation System," issued 25 Jul. 1995, to Smith et al. (Smith '531). In Smith '531, an axially extendable sleeve is used in the inner wall of the tuning passage in order to change the length of the tuning passage, thereby changing the isolation frequency. Another development in the design of tunable Halwes-type isolators was disclosed in U.S. Pat. No. 5,704,596, titled "Vibration Isolation System," issued 6 Jan. 1998, to Smith et al. (Smith '596). In Smith '596, a sleeve is used in the inner wall of the tuning passage in order to change the cross sectional area of the tuning passage itself, thereby changing the isolation frequency during operation. Both Smith '531 and Smith '596 were notable attempts to actively tune the isolator.

Another development in the area of vibration isolation is the tunable vibration isolator disclosed in U.S. Pat. No. 6,695,106, titled "Method and Apparatus for Improved Vibration Isolation," issued 24 Feb. 2004, to Smith et al, which is hereby incorporated by reference.

Although the foregoing developments represent great strides in the area of vibration isolation, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
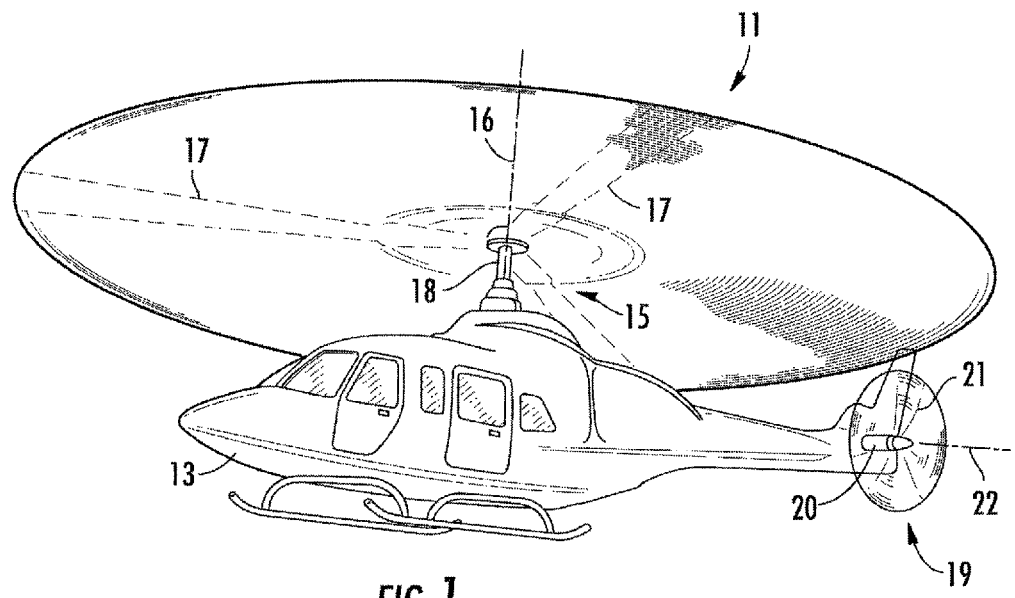
FIG. 1 is a perspective view of a helicopter, according to the present application.

Referring to FIG. 1 in the drawings, a helicopter 11 according to the present application is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a vertical axis 16 of main rotor shaft 18. Tail rotor blades 21 generally rotate about a lateral axis 22 of tail rotor shaft 20. Helicopter 11 also includes a vibration isolation system according to the present application for isolating fuselage 13 or other portions of helicopter 11 from mechanical vibrations, such as harmonic vibrations, which are associated with the propulsion system and which arise from the engine, transmission, and rotors of helicopter 11.

Figure 2A:
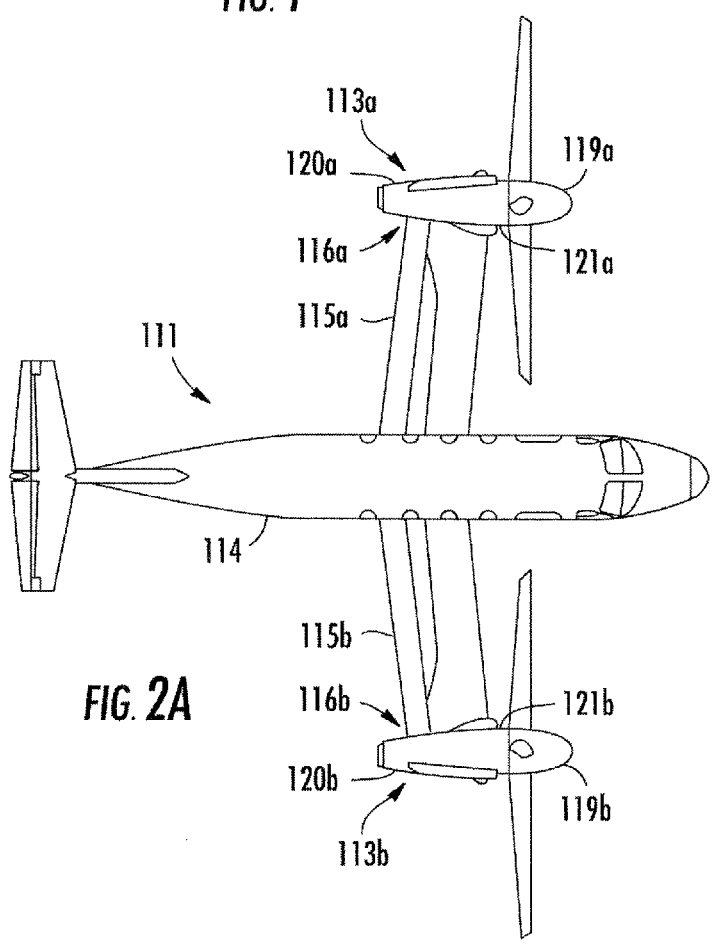
FIG. 2A is a plan view of a tilt rotor aircraft, according to the present application in an airplane mode.
Figure 2B:
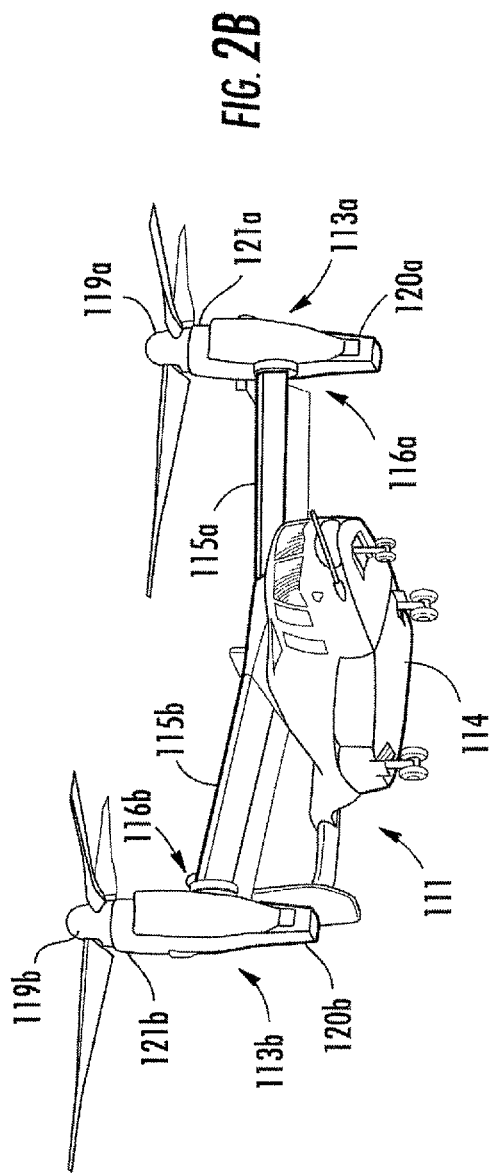
FIG. 2B is a perspective view of a tilt rotor aircraft, according to the present application in a helicopter mode.

The systems of the present application may also be utilized on other types of rotary wing aircraft. Referring now to FIGS. 2A and 2B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present application for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
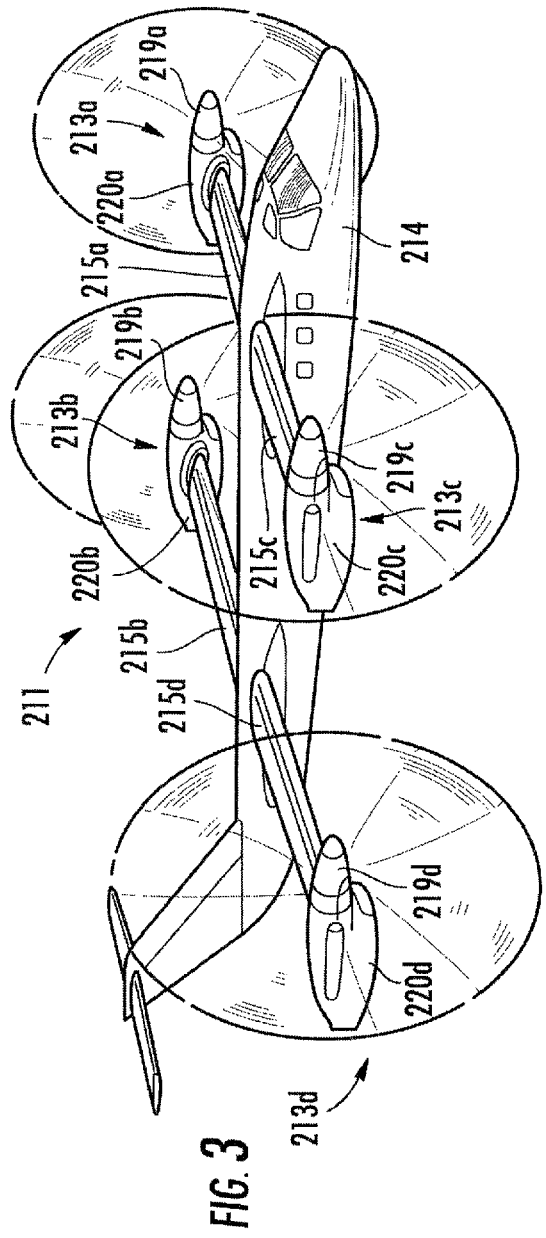
FIG. 3 is a perspective view of a quad tilt rotor aircraft, according to the present application in an airplane mode.

Referring now to FIG. 3 in the drawings, a quad tilt rotor aircraft 211 according to the present application is illustrated. As with the tilt rotor aircraft 111 of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration isolation system according to the present application for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211. It should be understood that the systems of the present application may be used with any aircraft on which it would be desirable to have vibration isolation, including unmanned aerial vehicles that are remotely piloted.

Figure 4:
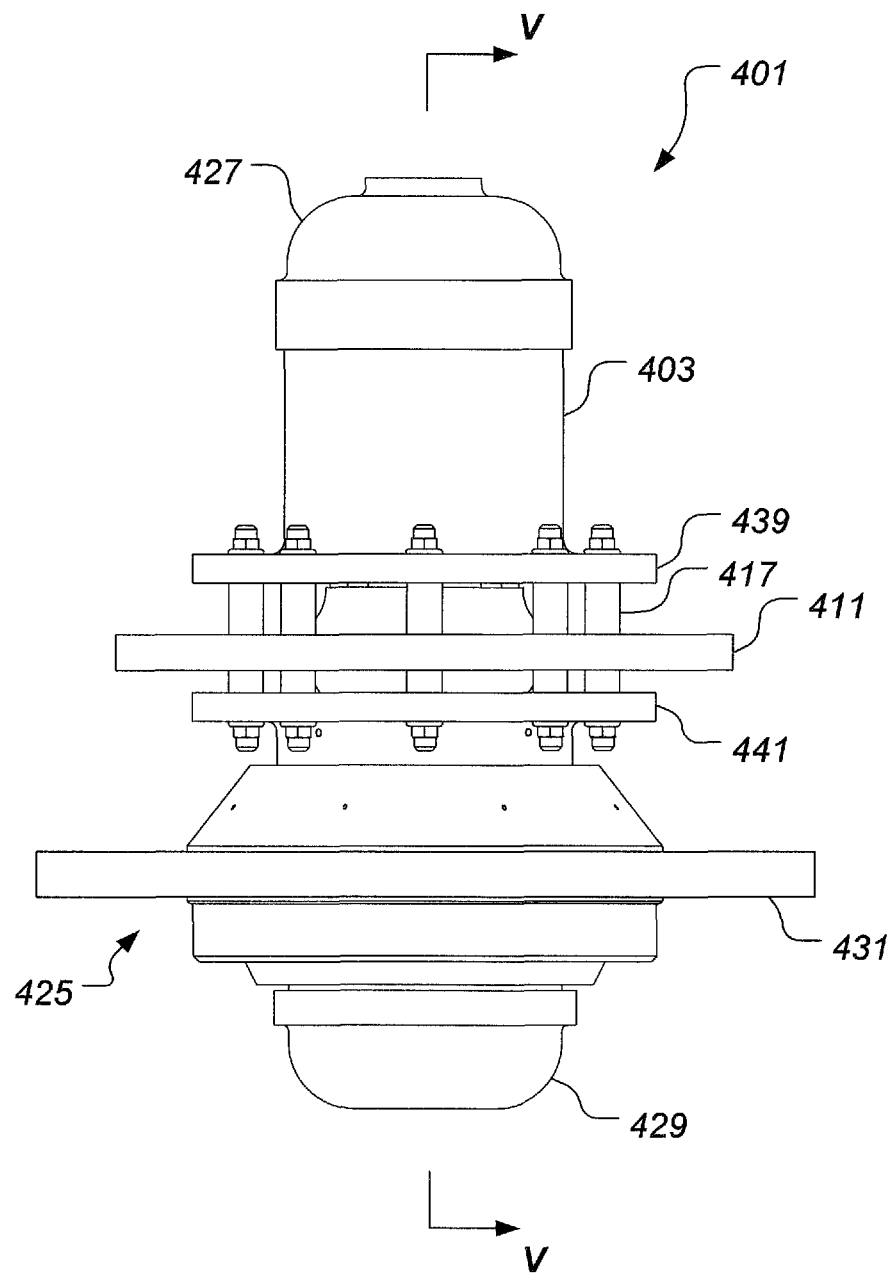
FIG. 4 is a side view of a vibration isolator, according to the preferred embodiment of the present application.
Figure 5:
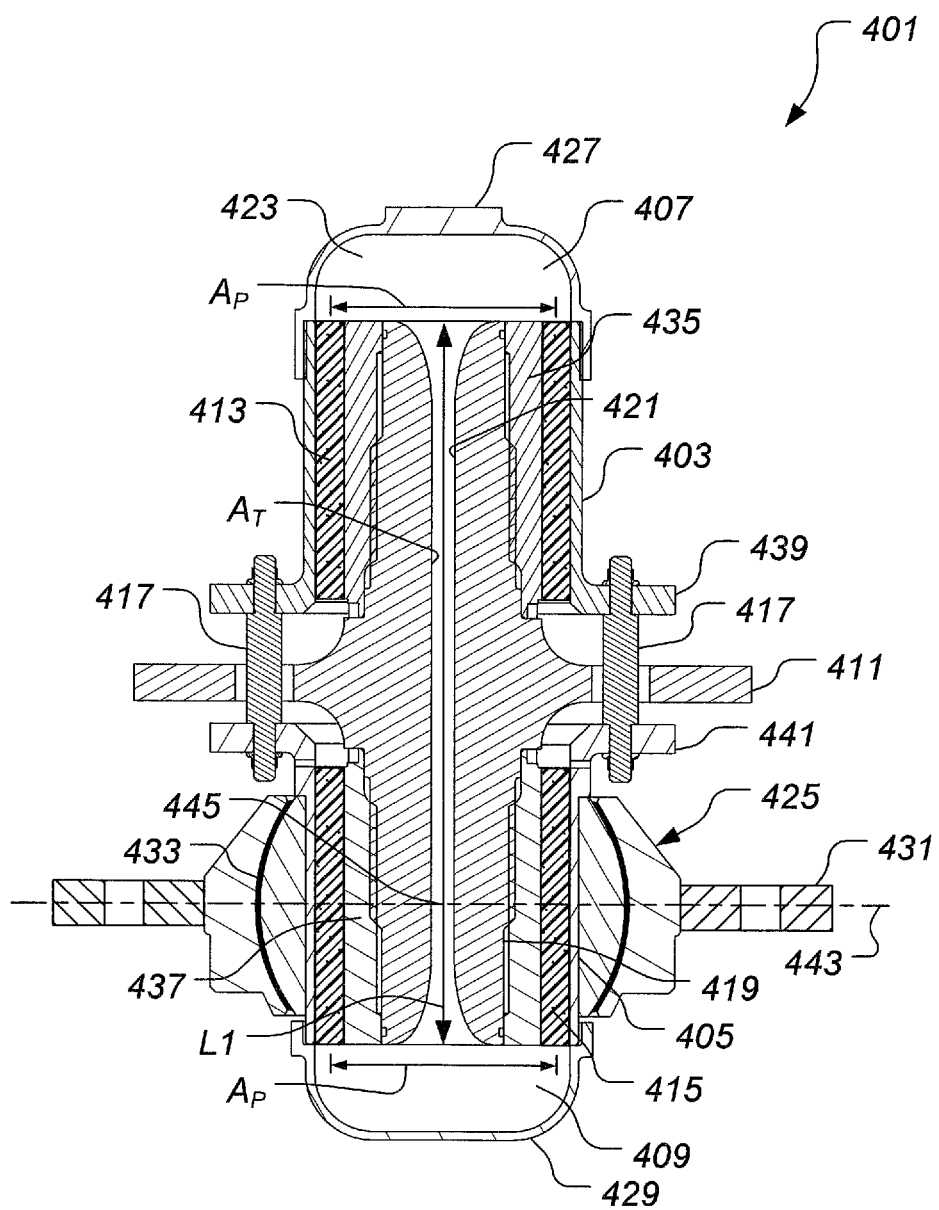
FIG. 5 is a cross-sectional view of the vibration isolator, taken from section lines V-V in FIG. 4, according to the preferred embodiment of the present application.

Referring now to FIGS. 4 and 5, a vibration isolator 401 according to the present application is illustrated. Isolator 401 comprises an upper housing 403 and a lower housing 405. An upper reservoir housing 427 and a lower reservoir housing 429 are coupled to end portions of upper housing 403 and a lower housing 405, respectively. Each upper reservoir housing 427 and a lower reservoir housing 429 define an upper fluid chamber 407 and a lower fluid chamber 409, respectively. A piston spindle 411 includes a cylindrical portion that is at least partially disposed within the interior of upper housing 403 and lower housing 405. A plurality of studs 417 rigidly couple together upper housing 403 and a lower housing 405 via an upper ring 439 and a lower ring 441, respectively, so that upper housing 403 and lower housing 405 function as a single rigid body. Studs 417 extend through piston spindle 411 within apertures sized to prevent any contact between studs 417 and piston spindle 411 during operation. Further, piston spindle 411 is resiliently coupled to upper housing 403 and lower housing 405 via an upper elastomer member 413 and a lower elastomer member 415, respectively. Upper elastomer member 413 and lower elastomer member 415 each function similar to a journal bearing, as further discussed herein.

Figure 6:
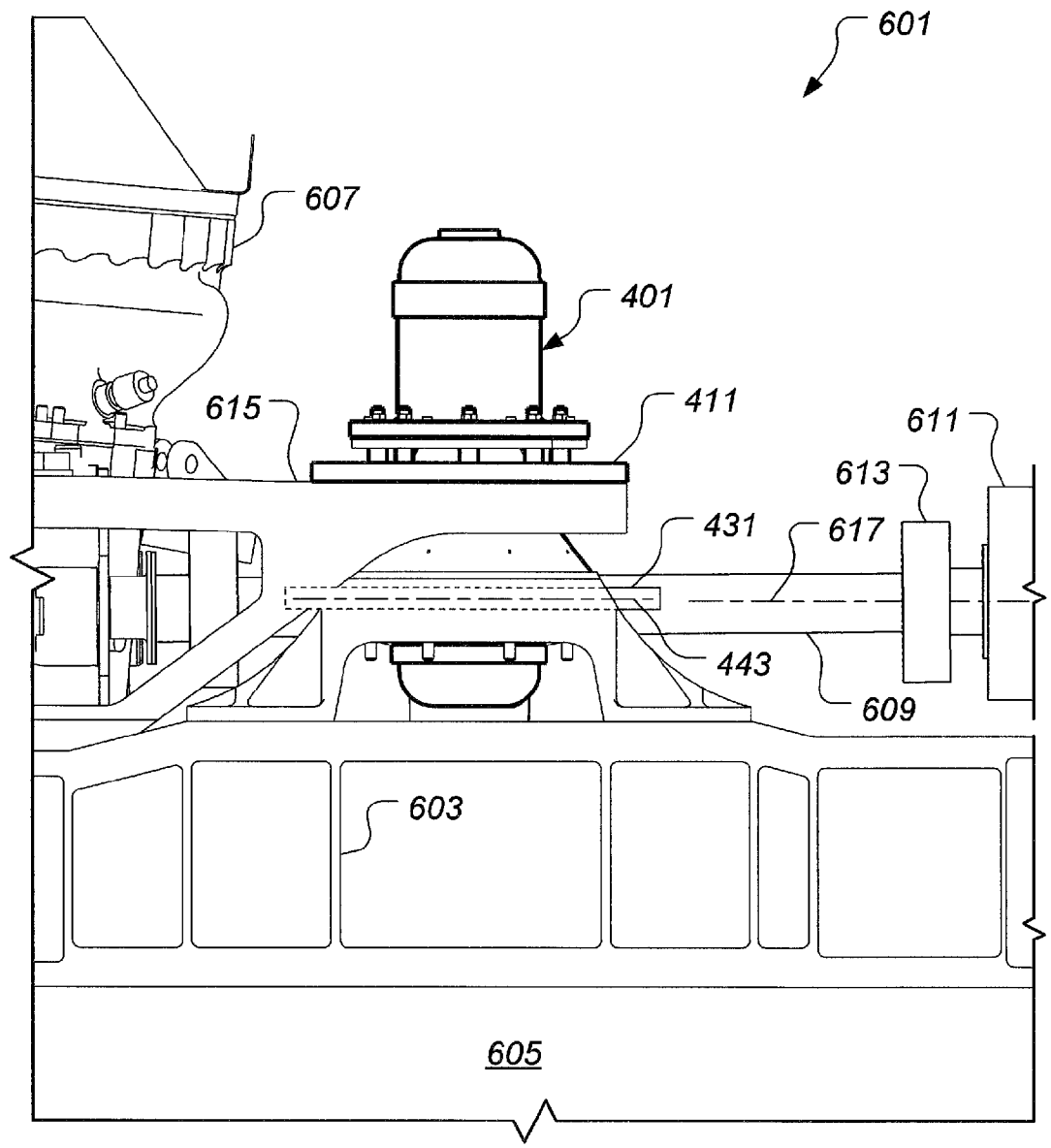
FIG. 6 is a side view of a pylon system, according to the preferred embodiment of the present application.

Piston spindle 411 is coupled to a vibrating body, such as a transmission of an aircraft via a pylon assembly, such as a pylon assembly 601 shown in FIG. 6. A spherical bearing assembly 425 is coupled to lower housing 405. Spherical bearing assembly 425 includes an attachment member 431 configured for coupling the spherical bearing assembly 425 to a body to be isolated from vibration, such as a roof beam of an airframe in an aircraft, such as roof beam 603 shown in FIG. 6. In such an arrangement, the airframe serves as the body to be isolated from vibration, and the transmission of the aircraft serves as the vibrating body. Spherical bearing assembly 425 includes a spherical elastomeric member 433 having an elastomeric material bonded between a non-resilient concave member and a non-resilient convex member. Spherical elastomeric member 433 is configured to compensate for misalignment in loading between the pylon assembly 601 and roof beam 603 through shearing deformation of the elastomeric material. Spherical elastomeric member 433 is partially spherical shaped with a rotational center point 445 that lies on a centerline plane 443 of attachment member 431. Furthermore, spherical bearing assembly 425 is uniquely positioned and located to reduce an overall installation height of vibration isolator 401, as well is provide optimized performance of pylon assembly 601 and related propulsion components, as discussed further herein with regard to FIG. 6.

Upper elastomer member 413 and lower elastomer member 415 seal and resiliently locate piston spindle 411 within the interior upper housing 403 and lower housing 405. Upper housing 403 and lower housing 405 can each be coupled to piston spindle 411 with an upper adapter 435 and lower adapter 437, respectively. Upper elastomer member 413 and lower elastomer member 415 function at least as a spring to permit piston spindle 411 to move or oscillate relative to upper housing 403 and lower housing 405. Upper elastomer member 413 and lower elastomer member 415 can be a solid elastomer member, or alternatively can be alternating layers of non-resilient shim members and elastomer layers.

Isolator 401 further includes an elongated portion 419 integral with piston spindle 411, the elongated portion 419 being configured to define a tuning passage 421. Tuning passage 421 axially extends through elongated portion 419 to provide for fluid communication between upper fluid chamber 407 and lower fluid chamber 409. The approximate length of tuning passage 421 preferably coincides with the length of elongated portion 419, and is further defined by L1 in FIG. 5. Tuning passage 421 is generally circular in cross-section and can be partially tapered longitudinally in order to provide efficient fluid flow.

A tuning fluid 423 is disposed in upper fluid chamber 407, lower fluid chamber 409, and tuning passage 421. Tuning fluid 423 preferably has low viscosity, relatively high density, and non-corrosive properties. For example, tuning fluid 423 may be a proprietary fluid, such as SPF I manufactured by LORD CORPORATION. Other embodiments may incorporate hydraulic fluid having suspended dense particulate matter, for example.

The introduction of a force into piston spindle 411 translates piston spindle 411 and elongated portion 419 relative to upper housing 403 and lower housing 405. Such a displacement of piston spindle 411 and elongated portion 419 forces tuning fluid 423 to move through tuning passage 421 in the opposite direction of the displacement of piston spindle 411 and elongated portion 419. Such a movement of tuning fluid 423 produces an inertial force that cancels, or isolates, the force from piston spindle 411. During typical operation, the force imparted on piston spindle 411 is oscillatory; therefore, the inertial force of tuning fluid 423 is also oscillatory, the oscillation being at a discrete frequency, i.e., isolation frequency.

The isolation frequency ($f_i$) of vibration isolator 401 can be represented by the following equation:

$$f_i = \frac{1}{2\pi}\sqrt{\frac{K}{R(R-1)m_i}}$$

In the above equation, R represents the ratio of the functional area $A_p$ of piston spindle 411 to the total area $A_T$ inside the tuning passage 421. As such, $R=A_p/A_T$. Mass of tuning fluid 423 is represented by $m_t$. The combined spring rate of elastomer members 413 and 415 is represented by K.

Figure 7:
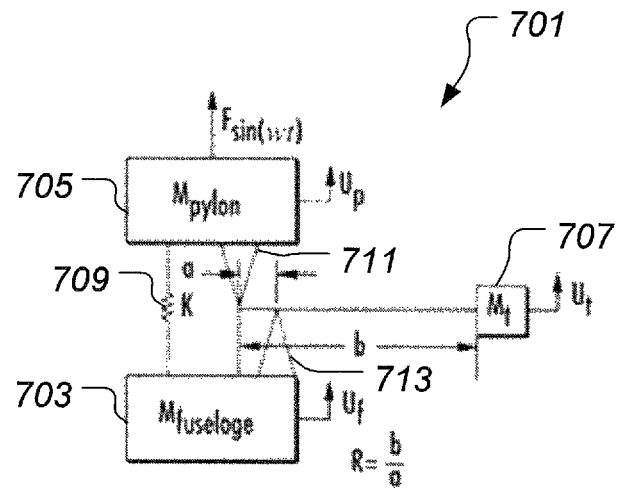
FIG. 7 is a mechanical equivalent force diagram of the vibration isolator of FIGS. 4 and 5.

Referring briefly to FIG. 7 in the drawings, a mechanical equivalent model 701 for vibration isolator 401 of FIGS. 4 and 5 is illustrated. In mechanical equivalent model 701, a box 703 represents the mass of the fuselage $M_{fuselage}$; a box 705 represents the mass of the pylon assembly $M_{pylon}$; and a box 707 represents the mass of the tuning mass $M_t$, in this case, the mass of tuning fluid 423. A vibratory force $F \cdot \sin(\omega t)$ is generated by the transmission and propulsion system. Force $F \cdot \sin(\omega t)$ is a function of the frequency of vibration of the transmission and propulsion system.

Force $F \cdot \sin(\omega t)$ causes an oscillatory displacement $u_p$ of the pylon assembly; an oscillatory displacement of the fuselage $u_f$; and an oscillatory displacement of the tuning mass $u_t$. Elastomer members 413 and 415 are represented by a spring 709 disposed between the fuselage $M_{fuselage}$ and the pylon assembly $M_{pylon}$. Spring 709 has a spring constant K.

In mechanical equivalent model 701, tuning mass $M_t$ functions as if cantilevered from a first fulcrum 711 attached to the pylon assembly $M_{pylon}$, and a second fulcrum 713 attached to the fuselage $M_{fuselage}$. The distance a from first fulcrum 711 to second fulcrum 713 represents the cross-sectional area of tuning passage 421, and the distance b from first fulcrum 711 to the tuning mass $M_t$ represents the effective cross-sectional area of piston spindle 411, such that an area ratio, or hydraulic ratio, R is equal to the ratio of b to a. Mechanical equivalent model 701 leads to the following equation of motion for the system:

$$\begin{bmatrix} M_{pylon}+(R-1)^2M_t & -R(R-1)M_t \\ -R(R-1)M_t & M_{fuselage}+R^2M_t \end{bmatrix}\begin{Bmatrix} \ddot{u}_p \\ \ddot{u}_f \end{Bmatrix} + \begin{bmatrix} K & -K \\ -K & K \end{bmatrix}\begin{Bmatrix} u_p \\ u_f \end{Bmatrix} = \begin{Bmatrix} F\sin(\omega t) \\ 0 \end{Bmatrix}$$

As is evident, no means for actively tuning vibration isolator 401 is available. Once the cross-sectional areas of tuning passage 421 and piston spindle 411 are determined, and the tuning fluid is chosen, the operation of vibration isolator 401 is set. However, an embodiment of vibration isolator 401 can be configured such that the isolation frequency can be selectively altered and optimized by the removing and replacing elongated portion 419 from piston spindle 411 with another elongated portion 419 having a different diameter tuning passage 421. As such, vibration isolator 401 can be adaptable to treat a variety of isolation frequencies, as well as being adaptable for variances in stiffness K of upper and lower elastomer members 413 and 415.

Referring to FIG. 6, a pylon system 601 having a vibration isolator 401 is illustrated with pylon structure 615 and roof beam 603 in an aircraft, such as helicopter 11. In the illustrated embodiment, roof beam 603 is coupled to an airframe 605, while pylon structure 615 is coupled to a transmission 607. A driveshaft 609, having a driveshaft axis 617, carries mechanical power from an engine 611 to transmission 607. Typically, one or more couplings, such as coupling 613, may be used to compensate for axial and angular misalignment between transmission 607 and engine 611.

Figure 8:
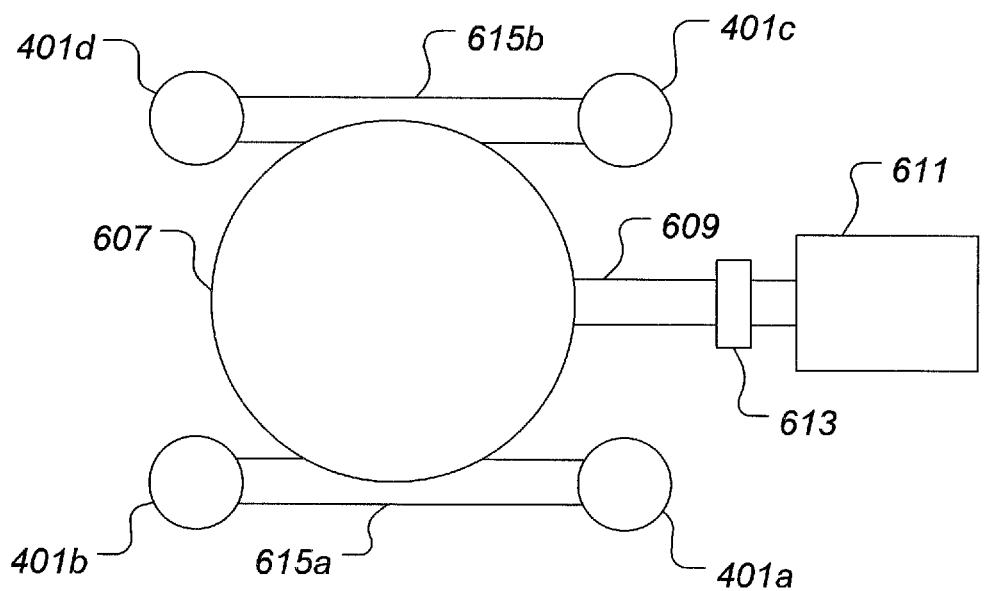
FIG. 8 is a schematic plan view of the pylon system of FIG. 6, according to the preferred embodiment of the present application.

Referring briefly to FIG. 8, pylon system 601 is schematically illustrated in a plan view. In the illustrated embodiment, a first pylon structure 615a is mounted with a first vibration isolator 401a and a second vibration isolator 401b, while a second pylon structure 615b is mounted with a third vibration isolator 401c and a fourth vibration isolator 401d. Each vibration isolator 401a-401d is mounted substantially vertical, as illustrated in FIG. 6. Further, it should be appreciated that even though a single engine 611 and transmission 607 are illustrated, alternative embodiments of pylon system 601 may employ any practical number of engines and transmissions. Furthermore, it is contemplated that any plurality of pylon structures and vibration isolators may be used in a variety of orientations.

Referring again also to FIG. 6, pylon system 601 is configured such that transmission 607 is "soft mounted" with a vibration isolator 401 located at each end of a pylon structure 615. During operation, each vibration isolator 401 allows each pylon structure 615 to float relative to roof beam 603 through the deformation of upper elastomer member 413, lower elastomer member 415, and spherical elastomeric member 433. If coupling 613 is required to compensate for a large amount of axial and angular misalignment, then the size and complexity of coupling 613 is undesirably large. Further, it is desirable to minimize the size and complexity of aircraft components in order to minimize weight and expense of the aircraft, thereby maximizing performance and reducing manufacturing associated expenditure. As such, vibration isolator 401 is uniquely configured to reduce the size and complexity of drive system components, such as coupling 613. More specifically, spherical bearing assembly 425 is configured so that centerline plane 443 of attachment member 431 lies on or near a waterline plane of driveshaft axis 617 so as to reduce a moment arm that could otherwise contribute to axial (chucking) misalignment. An undesirable moment arm could be produced if centerline plane 443 of attachment member 431 were to lie a significant moment arm distance, as measured in the waterline direction, from driveshaft axis 617. Chucking occurs essentially when engine 611 and transmission translate towards or away from each other. Further, the location of spherical bearing assembly 425 circumferentially around lower housing 405 reduces the overall height of vibration isolator 401. A compact pylon system 601 improves performance by reducing moment arms that can react between components.

The system of the present application provides significant advantages, including: providing a vibration isolator that is configured with a spherical bearing assembly located to minimize isolator length, optimize vibration reduction in a pylon system, and reduce misalignment in a drive shaft coupling.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A vibration isolator, comprising:
an upper housing and a lower housing;
an upper reservoir housing defining an upper fluid chamber;
a lower reservoir housing defining a lower fluid chamber;
a piston spindle resiliently coupled to the upper housing with an upper elastomer member, the piston spindle being resiliently coupled to the lower housing with a lower elastomer member;
an elongated portion having a tuning passage;
a tuning fluid disposed within the upper fluid chamber, the lower fluid chamber, and the tuning passage;
a spherical bearing assembly having an attachment member;
wherein the spherical bearing assembly is located at least partially around the lower housing;
wherein the piston spindle is coupled to a vibrating body;
wherein the vibrating body is at least one of an aircraft engine, an aircraft transmission,
an aircraft propeller, or an aircraft rotor.

2. The vibration isolator according to claim 1, the spherical bearing assembly further comprising:
a spherical elastomeric member that is at least partially spherical shaped.

3. The vibration isolator according to claim 2, wherein the spherical elastomeric member is configured to rotationally deform about a center point, the center point lying on a centerline plane of attachment member.

4. The vibration isolator according to claim 1, wherein the spherical bearing assembly is located to have a waterline location similar to a driveshaft axis.

5. The vibration isolator according to claim 1, wherein the piston spindle is configured for coupling to a pylon assembly of an aircraft.

6. The vibration isolator according to claim 1, wherein the spherical bearing assembly is configured for coupling to a roof structure of an aircraft.

7. The vibration isolator according to claim 1, further comprising:
a plurality of studs rigidly attaching the upper housing to the lower housing.

8. The vibration isolator according to claim 7, wherein the plurality of studs each extends through a plurality of apertures in the piston spindle.

9. A pylon system for an aircraft, the pylon system comprising:
a pylon structure coupled to a transmission;
an airframe structure;
an engine in mechanical communication with the transmission with a drive shaft and a coupling;
a vibration isolator coupled between the pylon structure and the airframe structure, the vibration isolator comprising:
an upper housing and a lower housing;
an upper reservoir housing defining an upper fluid chamber;
a lower reservoir housing defining a lower fluid chamber;
a piston spindle resiliently coupled to the upper housing with an upper elastomer member, the piston spindle being resiliently coupled to the lower housing with a lower elastomer member;
an elongated portion having a tuning passage;
a tuning fluid disposed within the upper fluid chamber, the lower fluid chamber, and the tuning passage;

a spherical bearing assembly with an attachment member;
wherein the spherical bearing assembly of the vibration isolator is located near a waterline location of a rotational axis of the drive shaft;
wherein the spherical bearing assembly is located at least partially around the lower housing of the vibration isolator.

10. The pylon system according to claim 9, the spherical bearing assembly of the vibration isolator further comprising:
a spherical elastomeric member that is at least partially spherical shaped.

11. The pylon system according to claim 10, wherein the spherical elastomeric member is configured to rotationally deform about a center point, the center point lying on a centerline plane of attachment member.

12. The pylon system according to claim 9, wherein the transmission is a vibrating body.

13. The pylon system according to claim 9, the vibration isolator further comprising:
a plurality of studs rigidly attaching the upper housing to the lower housing.

14. The pylon system according to claim 13, wherein the plurality of studs each extends through apertures in the piston spindle.

15. The pylon system according to claim 9, wherein the location of the spherical bearing assembly minimizes misalignment in the coupling.

16. The pylon system according to claim 9, wherein the location of the spherical bearing assembly minimizes chucking in the coupling.

17. The pylon system according to claim 9, wherein the coupling is located between the engine and the transmission.

* * * * *